United States Patent [19]

Kamamura

[11] Patent Number: 5,022,353
[45] Date of Patent: Jun. 11, 1991

[54] VARIABLE-CYCLE ENGINE

[75] Inventor: Hideo Kamamura, Kanagawa, Japan

[73] Assignee: Isuzu Ceramics Research Institute Co., Ltd., Kanagawa, Japan

[21] Appl. No.: 514,884

[22] Filed: Apr. 26, 1990

[30] Foreign Application Priority Data

| Apr. 26, 1989 | [JP] | Japan | 1-106583 |
| May 1, 1989 | [JP] | Japan | 1-112507 |
| May 1, 1989 | [JP] | Japan | 1-112509 |

[51] Int. Cl.$^5$ ............................................. F02B 69/06
[52] U.S. Cl. ................................... 123/21; 123/DIG. 7; 123/305; 123/90.11; 60/607
[58] Field of Search ............... 123/21, DIG. 7, 299, 123/300, 305, 90.11; 60/607

[56] References Cited

U.S. PATENT DOCUMENTS

| 1,077,363 | 11/1913 | Nash | 123/21 |
| 1,274,777 | 8/1918 | Prescott | 123/21 |
| 3,100,478 | 8/1963 | Crooks | 123/21 |
| 4,392,459 | 7/1983 | Chareire | 123/21 |
| 4,769,993 | 9/1988 | Kawamura | 60/607 |

FOREIGN PATENT DOCUMENTS

| 0422928 | 12/1925 | Fed. Rep. of Germany | 123/21 |
| 2309916 | 10/1974 | Fed. Rep. of Germany | 123/300 |
| 0008315 | 1/1982 | Japan | 123/300 |
| 0236796 | 7/1925 | United Kingdom | 123/21 |
| 2219346 | 12/1989 | United Kingdom | 123/21 |

Primary Examiner—Willis R. Wolfe
Assistant Examiner—Thomas N. Moulis
Attorney, Agent, or Firm—Staas & Halsey

[57] ABSTRACT

A variable-cycle engine operates in a two-cycle mode when the rotational speed of the engine is lower than a predetermined speed and in a four-cycle mode when the rotational speed of the engine is higher than the predetermined speed. The engine has a first intake port and an exhaust port which are defined in an upper portion of a cylinder, and a second intake port defined in a lower side portion of the cylinder. When the rotational speed of the engine is lower than the predetermined speed, the engine operates as a two-cycle engine with the second intake valve and the exhaust valve in operation. When the rotational speed of the engine is higher than the predetermined speed, the engine operates as a four-cycle engine with the first intake port and the exhaust port in operation. Alternatively, the engine has an intake port defined in a lower side portion of a cylinder and an exhaust port defined in an upper portion of the cylinder, the exhaust port being openable and closable by an exhaust valve with variable timing. Depending on the rotational speed of the engine, the timing with which the exhaust valve operates is varied, and the engine operates in one of different cycles. The engine is associated with a turbocharger combined with an electric motor. In a lower speed range, the electric motor is energized to assist in turbocharging operation for thereby increasing the torque produced by the engine.

9 Claims, 7 Drawing Sheets

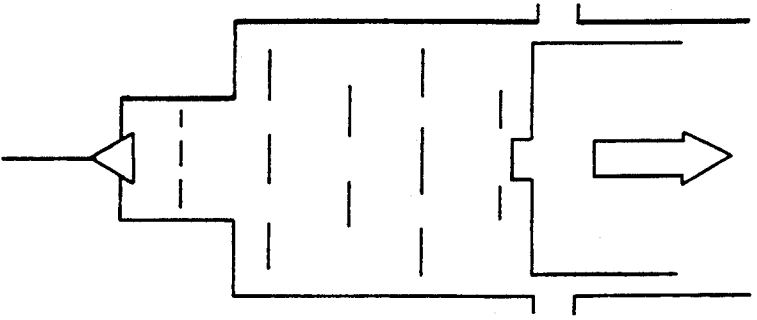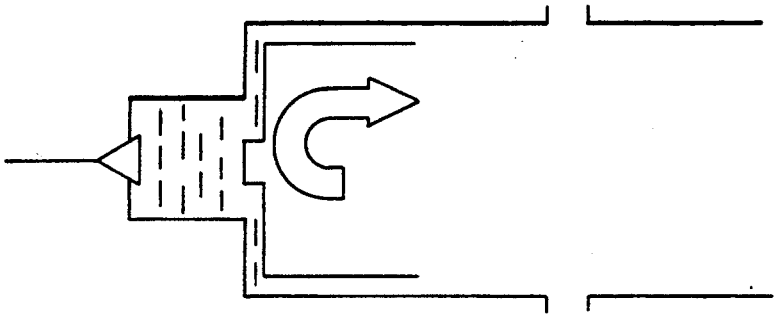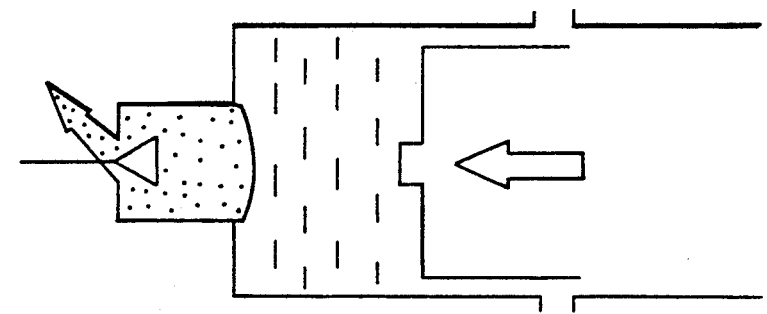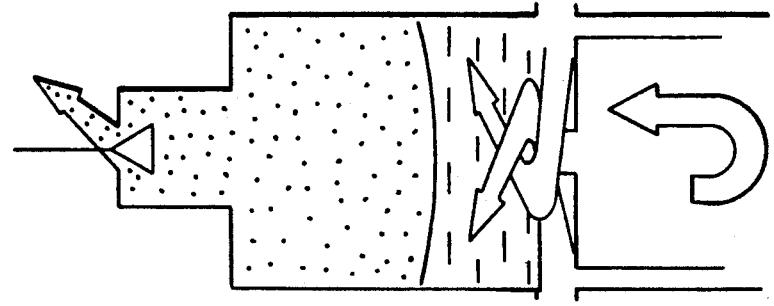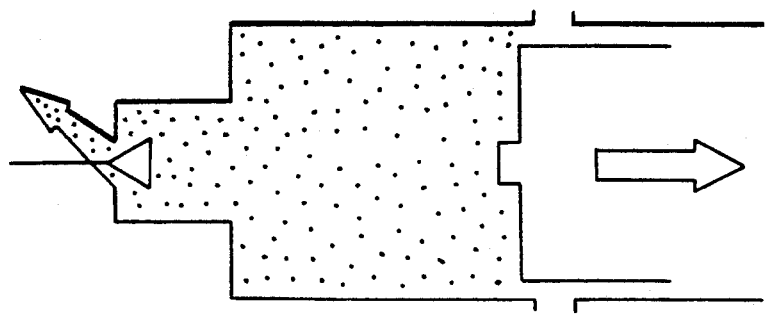

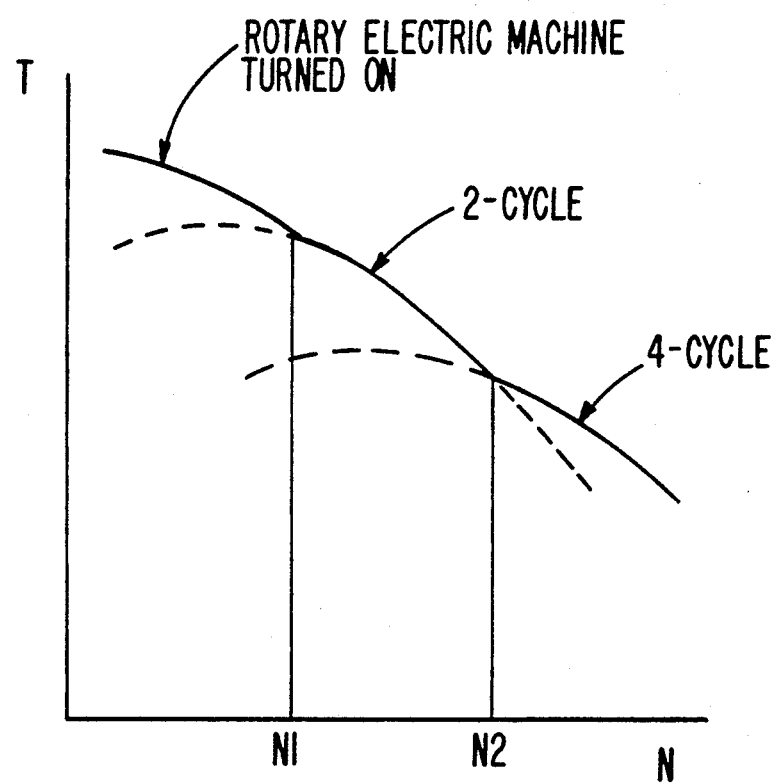

VARIABLE-CYCLE ENGINE

BACKGROUND OF THE INVENTION

1. Field of the Invention

The present invention relates to a variable-cycle engine which operates in a two-cycle mode when the rotational speed of the engine is lower than a predetermined speed and in a four-cycle mode when the rotational speed of the engine is higher than the predetermined speed.

2. Description of the Prior Art

Ordinary engines are roughly grouped into two-cycle engines in which the intake, compression, power, and exhaust strokes are performed while the crankshaft makes one revolution and four-cycle engines in which the above four strokes are carried out while the crankshaft makes two revolutions.

In the two-cycle engines, intake ports are positioned in a lower portion of a cylinder liner. Since intake air is drawn and exhaust gases are discharged when the piston is lowered, and the explosion occurs each time the crankshaft makes one revolution, the rotational speed of the output shaft suffers less fluctuations even in a low engine speed range, and the engine can produce a high-torque output.

However, since the intake and exhaust strokes are simultaneously performed in the two-cycle engines, the intake air and the exhaust gases are not fully exchanged particularly in a high engine speed range. Therefore, the two-cycle engines are lower in efficiency and higher in fuel consumption.

In the four-cycle engines, intake air is drawn and exhaust gases are discharged in respective strokes. Therefore, the intake air and the exhaust gases are well exchanged in a high engine speed range. Accordingly, the four-cycle engines are highly efficient, and fuel consumption is lower.

The four-cycle engines suffer larger fluctuations in the rotational speed of the engine output shaft. Therefore, in a low engine speed range, the engine output torque is lower, and the engines do not operate smoothly.

SUMMARY OF THE INVENTION

In view of the aforesaid problems of the existing engines, it is an object of the present invention to provide a variable-cycle engine which operates as a two-cycle engine in an engine speed range lower than a predetermined speed, i.e., a lower engine speed range, and as a four-cycle engine in an engine speed range higher than the predetermined speed, i.e., a higher engine speed range.

To achieve the above object, there is provided in accordance with the present invention a variable-cycle engine selectively operable in different cycle modes depending on the rotational speed thereof, comprising a cylinder having a first intake port and an exhaust port which are defined in an upper portion thereof, a piston reciprocally fitted in the cylinder and having a piston head surface, the cylinder also having a second intake port defined in a cylindrical wall thereof and positioned such that the second intake port corresponds in position to the piston head surface when the piston is positioned near the bottom dead center thereof, an intake valve for opening and closing the first intake port, an exhaust valve for opening and closing the exhaust port, a sleeve valve slidably fitted over the cylinder and angularly movable around the cylinder, for opening and closing the second intake port, intake valve actuator means for actuating the intake valve to open and close the first intake port, exhaust valve actuator means for actuating the exhaust valve to open and close the exhaust port, sleeve valve actuator means for angularly moving the sleeve valve to open and close the second intake port, supercharging means for supplying intake air under pressure through at least the second intake port into the cylinder, two fuel injection nozzles alternately operable to inject fuel into the cylinder each time the engine makes one revolution, injection timing varying means for inactivating one of the two fuel injection nozzles, and cycle mode selecting means for detecting the rotational speed of the engine, and for activating the exhaust valve actuator means, inactivating the intake valve actuator means and the injection timing varying means, and activating the sleeve valve actuator means to open the second intake port, thereby operating the engine in a two-cycle mode, when the detected rotational speed is lower than a predetermined speed, and for activating the intake valve actuator means, the exhaust valve actuator means, and the injection timing varying means, and inactivating the sleeve valve actuator means to close the second intake port, thereby operating the engine in a four-cycle mode, when the detected rotational speed is higher than the predetermined speed.

According to the present invention, there is also provided a variable-cycle engine selectively operable in different cycle modes depending on the rotational speed thereof, comprising a cylinder having an exhaust port which is defined in an upper portion thereof, an exhaust valve for opening and closing the exhaust port, valve actuator means for actuating the exhaust valve to open and close the exhaust port, a piston reciprocally fitted in the cylinder and having a piston head surface, the cylinder also having an intake port defined in a cylindrical wall thereof and positioned such that the intake port corresponds in position to the piston head surface when the piston is positioned near the bottom dead center thereof, supercharging means for supplying intake air under pressure from the intake port into the cylinder, two fuel injection nozzles alternately operable to inject fuel into the cylinder each time the engine makes one revolution, injection timing varying means for inactivating one of the two fuel injection nozzles, and cycle mode selecting means for detecting the rotational speed of the engine, and for activating the exhaust valve actuator means to operate the exhaust valve each time the engine makes one revolution, and inactivating the injection timing varying means, thereby operating the engine in a two-cycle mode, when the detected rotational speed is lower than a predetermined speed, and for activating the exhaust valve actuator means to operate the exhaust valve each time the engine makes two revolutions, and activating the injection timing varying means, thereby operating the engine in a four-cycle mode, when the detected rotational speed is higher than the predetermined speed.

In a lower engine speed range, the engine operates as a two-cycle engine, and hence the engine rotates smoothly and produces high output torque. In a higher engine speed range, the engine operates as a four-cycle engine, and thus consumes less fuel and operates highly efficiently.

If the variable-cycle engine operates as a power unit for motor vehicles, then the number of gear positions of a transmission combined with the engine may be reduced or eliminated.

Furthermore, when the rotational speed of the engine is low, depending on the load on the engine, a reduction in the boost pressure due to a shortage of the exhaust energy is compensated for by energizing a rotary electric machine mounted on the shaft of a supercharging means, thereby to assisting in rotating the compressor of the supercharging means. Therefore, the boost pressure is increased to enable the engine to produce high output torque when the engine speed is low and the load on the engine is large.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 8a-e are diagrams showing certain strokes of the engine shown in FIG. 4 when it operates in the four-cycle mode;

FIG. 10 is a graph showing the relationship between rotational speeds and torques.

DETAILED DESCRIPTION OF THE PREFERRED EMBODIMENTS

A variable-cycle engine according to a first embodiment of the present invention will be described with reference to FIGS. 1 through 3.

Figure 1:
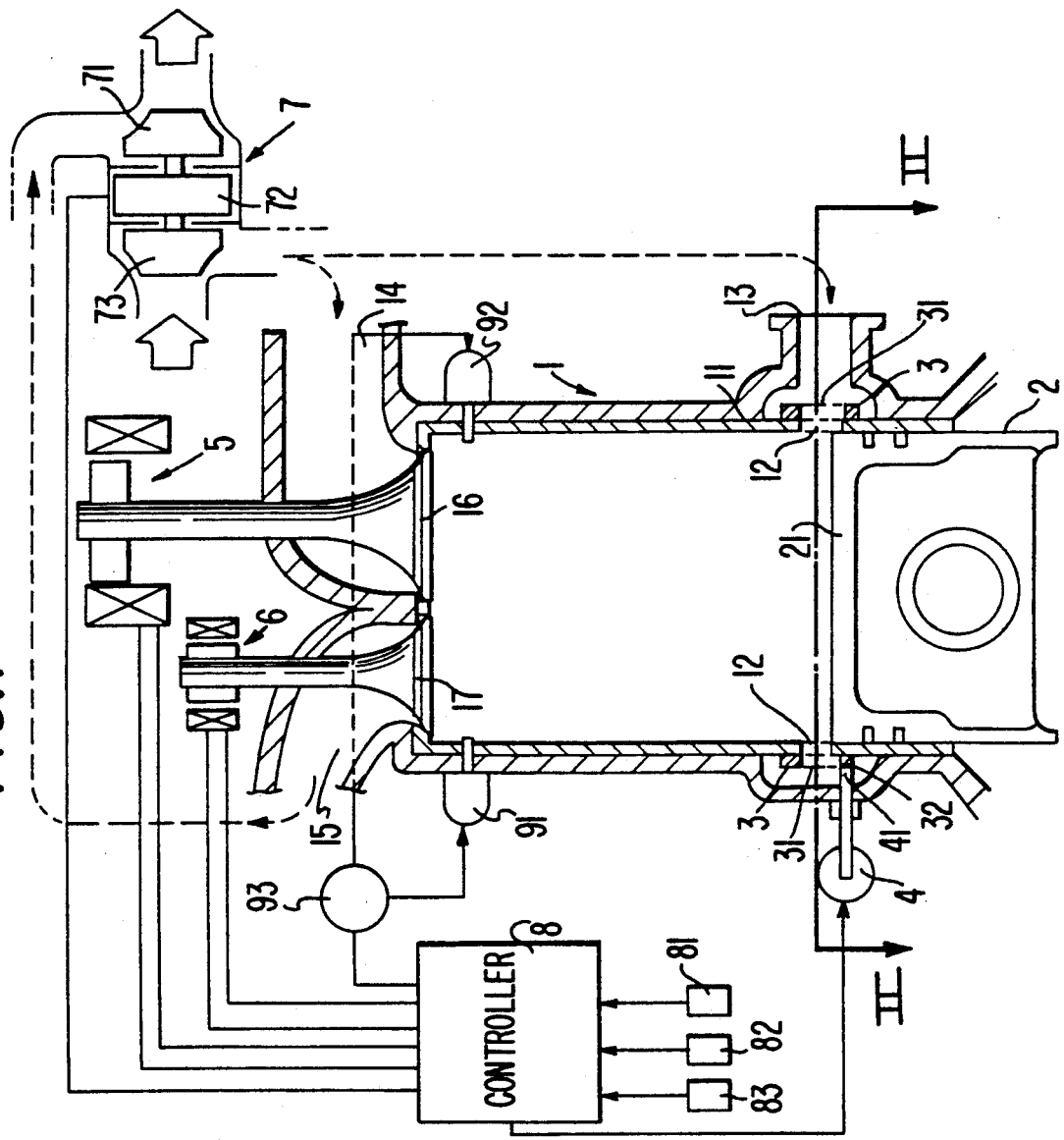
FIG. 1 is a cross-sectional view, partly in block form, of a variable-cycle engine according to a first embodiment of the present invention.
Figure 2:
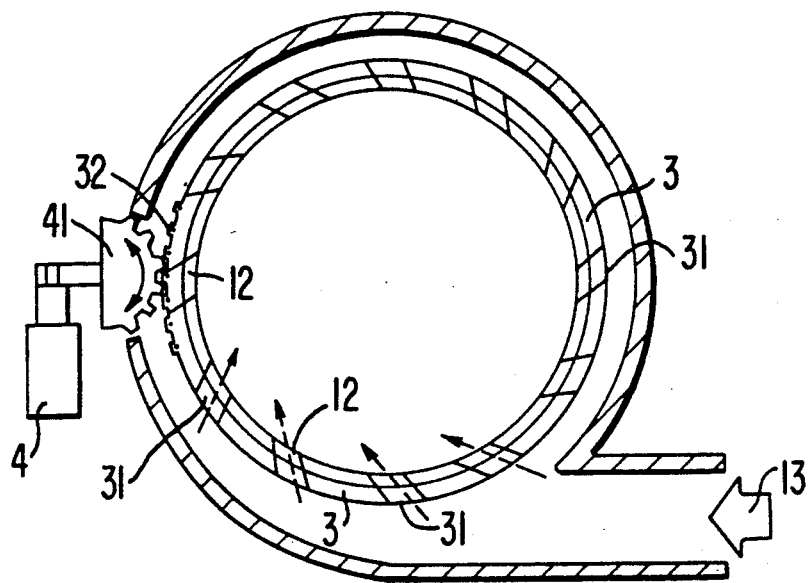
FIG. 2 is a cross-sectional view taken along line II—II of FIG. 1.
Figure 3:
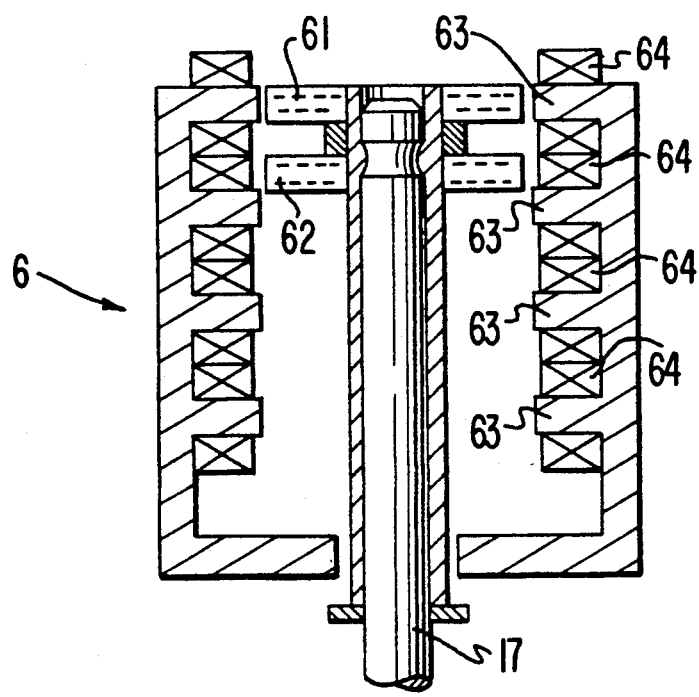
FIG. 3 is a cross-sectional view of a valve actuator.

As shown in FIGS. 1 and 2, a cylinder liner 11 is fitted against the inner wall of a cylinder 1. A piston 2 is reciprocally fitted in the cylinder 1. The cylinder liner 11 has a circumferential array of intake ports 12 defined in its peripheral wall. The intake ports 12 are positioned such that they are near the upper end of a piston head 21 of the piston 2 when the piston 2 reaches the bottom dead center.

The intake ports 12 are inclined with respect to the central axis of the cylinder 1 for introducing intake air from an intake pipe 13 as a swirling flow into the cylinder 1.

A sleeve valve 3 in the form of an annular strip is fitted over the cylinder liner 11 in covering relation to the openings of the intake ports 12. The sleeve valve 3 is circumferentially slidable on and about the cylinder liner 11. The sleeve valve 3 has holes 31 defined therein and corresponding in position to the intake ports 12. When the sleeve valve 3 is angularly moved circumferentially around the cylinder 1, the intake ports 12 are covered with those portions of the sleeve valve 3 which lie between the holes 31, thereby preventing intake air from passing through the intake ports 12. The sleeve valve 3 has a number of gear teeth 32 disposed on and along a lower edge thereof and projecting radially outwardly.

The sleeve valve 3 is actuatable by a sleeve valve actuator 4 which has a gear 41 held in mesh with the gear teeth 32 of the sleeve valve 3. When the sleeve valve actuator 4 is operated, it enables the gear 41 and the gear teeth 32 meshing therewith to turn the sleeve valve 3 through a predetermined angle. The sleeve valve actuator 4 is operable by a command signal from a controller 8 (described later on).

An intake valve 16 is disposed upwardly of the cylinder 1, for introducing intake air from an intake pipe 14 into the cylinder 1 depending on operation of the engine. The intake valve 16 can be opened and closed by an electromagnetic valve actuator 5 disposed above the intake valve 16.

An exhaust valve 17 is also disposed upwardly of the cylinder 1 adjacent to the intake valve 16, for discharging exhaust gases into an exhaust pipe 15 in an exhaust stroke of the engine. The exhaust valve 17 can be opened and closed by an electromagnetic valve actuator 6 disposed above the exhaust valve 17.

The electromagnetic valve actuators 5, 6 are identical in structure to each other. Only the electromagnetic valve actuator 6 will be described below by way of example with reference to FIG. 3.

Two permanent magnets 61, 62 are fitted over the end of the shank of the exhaust valve 17 in axially spaced relationship. The permanent magnets 61, 62 have respective outer peripheral portions which are magnetized in different polarities. For example, if the outer peripheral portion of the permanent magnet 61 is of N pole, then the outer peripheral portion of the permanent magnet 62 is of S pole.

Magnetic poles 63 are disposed in confronting relation to the permanent magnets 61, 62 and juxtaposed in the direction in which the exhaust valve 17 is movable. The magnetic poles 63 are spaced by intervals different from the interval by which the permanent magnets 61, 62 are spaced from each other. Coils 64 for controlled the polarity of the magnetic poles 63 are wound around the respective magnetic poles 63.

The coils 64 are energized under the control of the controller 8 such that the polarities of the magnetic poles 63 confronting the permanent magnets 61, 62 are successively varied. The electromagnetic forces thus acting between the permanent magnets 61, 62 and the magnetic poles 63 are combined to move the exhaust valve 17 in opening and closing directions.

A turbocharger 7 comprises a turbine 71, a rotary electric machine 72, and a compressor 73 which are arranged in coaxial relationship. When the turbine 71 is driven by the energy of exhaust gases discharged from the discharge pipe 15, the compressor 73 is rotated to supply air under pressure to the cylinder 1 through an intake pipe 13 communicating with the sleeve valve 3 and the intake pipe 14.

Depending on the operating condition of the engine, the rotary electric machine 72 is supplied with electric energy and hence operates as a motor to assist in rotating the compressor 73 for increasing the engine torque in a low engine speed range.

The rotational speed of the crankshaft of the engine is detected by an engine rotation sensor 81 for the detection of the rotational speed of the engine. The amount of fuel supplied to the engine is detected by an engine load sensor for the detection of the load on the engine. The crankshaft angle is detected by a position sensor 83 for the detection of the position of the piston. Detected signals from these sensors are applied to the controller 8.

Injection nozzles 91, 92 are mounted on an upper portion of the cylinder 1, for injecting fuel into the cylinder 1 in a direction along intake air swirls. The injection nozzles 91, 92 are connected to a fuel pump 93 by which the timing to inject fuel and the amount of fuel to be injection can be varied.

The controller 8 comprises a microcomputer having a central processing unit for effecting arithmetic operations, various memories for storing sequences for the arithmetic operations and a control sequences, and input/output ports. When the signals from the sensors are supplied to the controller 8, the predetermines arithmetic operations are carried out, and control signals are transmitted to the sleeve valve actuator 4, the electromagnetic valve actuators 5, 6, the rotary electric machine 72, and the fuel pump 93 according to the stored control sequence.

The variable-cycle engine according to the first embodiment operates as follows:

In an engine speed range in which the rotational speed indicated by the detected signal from the rotation sensor 81 is lower than a predetermined speed, the controller 8 applies a control signal to the sleeve valve actuator 4 to bring the holes 31 of the sleeve valve 3 into registry with the intake ports 12 of the cylinder liner 11, so that the engine will operate in a two-cycle mode. Therefore, the sleeve valve 3 is angularly positioned as shown in FIGS. 1 and 2.

When the piston 2 is lowered toward the bottom dead center, intake air supplied under pressure from the turbocharger 7 through the intake pipe 13 flows as swirling air into the cylinder 1 through the holes 31 and the intake ports 12 which are aligned with each other. The introduced swirling air forces the exhaust gases out of the cylinder 1 through the opened exhaust port 15, and is available as intake air which is needed in the next combustion stroke.

Then, the piston 2 moves upwardly, closing the intake ports 12 of the cylinder liner 11. Soon thereafter, the exhaust valve 17 is closed, and the volume of the cylinder 1 is compressed. At a final stage of the compression stroke, the temperature in the cylinder 1 rises to the point where fuel can be ignited. Then the injection nozzle 91 or 92 injects fuel into the cylinder 1. The injected fuel is ignited and combusted, whereupon the piston 2 is lowered under high combustion pressure for thereby rotating the crankshaft.

In the latter half of the expansion stroke, the exhaust valve 17 is opened, and the combustion gases are discharged under their own pressure through the exhaust pipe 15 to the turbocharger 7. The exhaust gases rotate the turbine 71 and are then discharged from the turbocharger 7.

Upon further descent of the piston 2, the gas pressure in the cylinder 1 sufficiently lowered. When the upper end of the piston 2 reaches the intake ports 12, intake air is supplied again under pressure from the turbocharger 7 into the cylinder 1 through the intake ports 12, scavenging any remaining exhaust gases from the cylinder 1.

At this time, any resistance to the influx of intake air is small and the intake air can be introduced into the cylinder 1 in a short period of time since the intake ports 12 are arrayed fully circumferentially in the lower portion of the cylinder liner 11 and held in communication with the holes 31 of the sleeve valve 3.

In an engine speed range in which the rotational speed indicated by the detected signal from the rotation sensor 81 is higher than a predetermined speed, the engine operates in a four-cycle mode.

In this mode, the controller 8 controls the electromagnetic valve actuator 5 and the sleeve valve actuator 4 such that the intake valve 16 is opened and closed by the electromagnetic valve actuator 5 in the intake stroke of an ordinary four-cycle engine and the intake ports 12 of the cylinder liner 11 are closed by the sleeve valve 3.

When the piston 2 is lowered, since the intake ports 12 of the cylinder liner 11 are closed by the sleeve valve 3, the combustion gases are prevented from flowing into the intake ports 12. In the intake stroke, sufficient intake air is introduced from the upper intake valve 16. As the lower volume of the cylinder 1 is not made a dead volume, the stroke of the piston can effectively be utilized.

Figure 4:
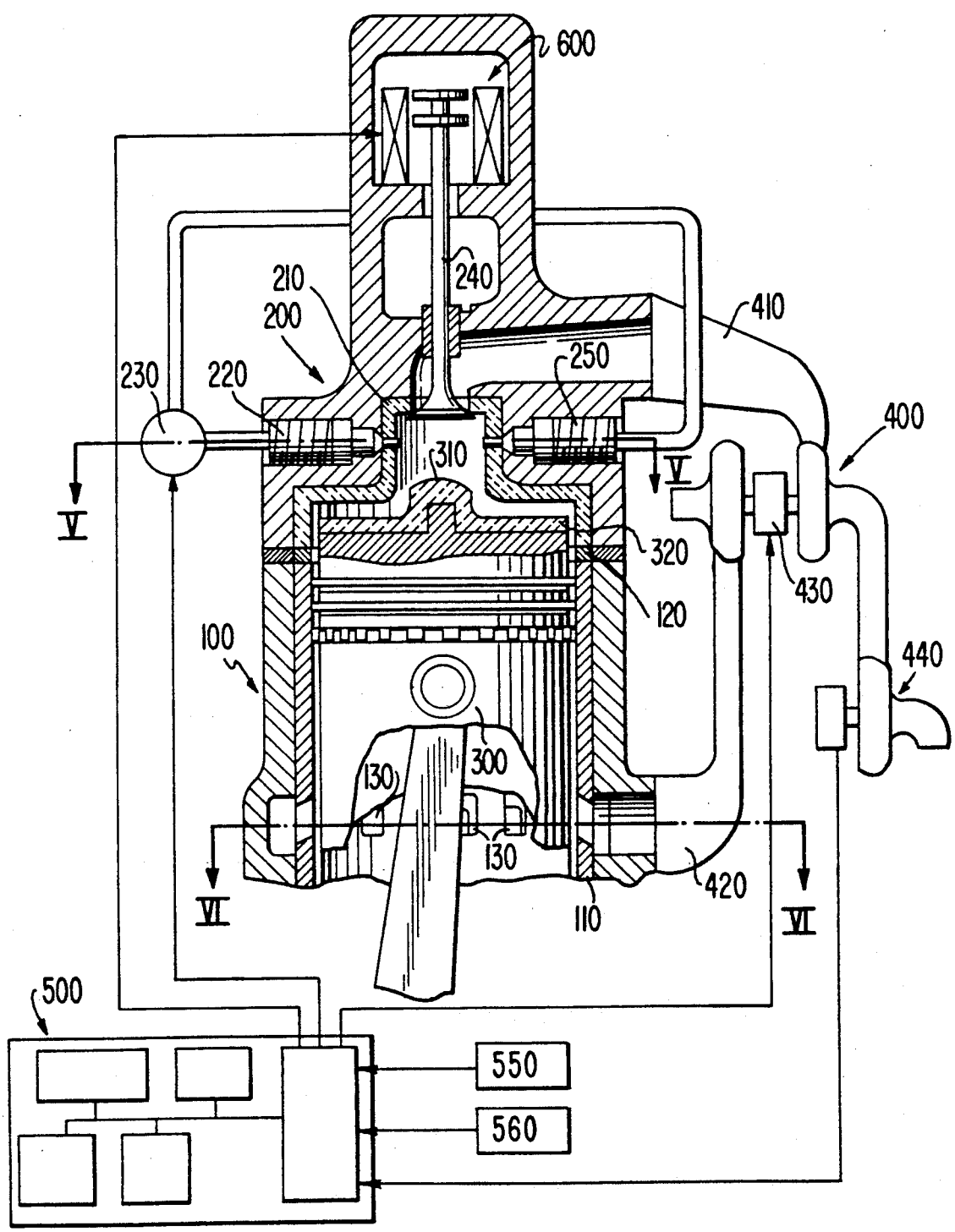
FIG. 4 is a cross-sectional view, partly in block form, of a variable-cycle engine according to a second embodiment of the present invention.

A variable-cycle engine according to a second embodiment will be described below with reference to FIGS. 4, 5, and 6.

A cylinder sleeve 110 is fitted against the inner wall of a cylinder 100. A piston 300 is reciprocally fitted in the cylinder 100. The cylinder sleeve 110 has a circumferential array of intake ports 130 defined in its peripheral wall. The intake ports 130 are positioned such that they are near the upper end of a piston head of the piston 300 when the piston 300 reaches the bottom dead center. The intake ports 130 are inclined with respect to the central axis of the cylinder 100 for introducing swirling intake air into the cylinder 100.

The engine has a prechamber 200 defined centrally in a portion above the cylinder 100 and having an inner wall covered with a sleeve 210 which is made of a heat-resistant heat insulating material such as ceramic. The sleeve 210 and the cylinder sleeve 110 are connected to each other through a heat insulating gasket 120.

Figure 5:
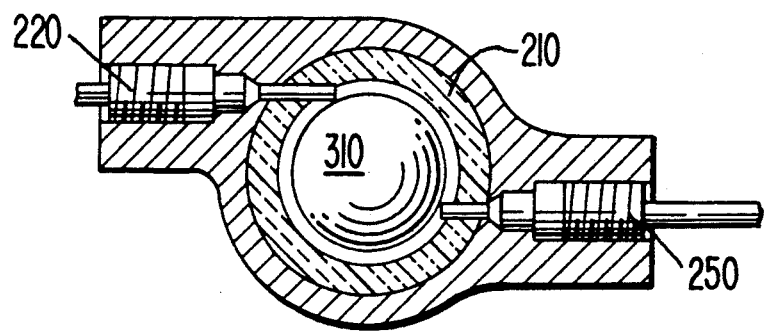
FIG. 5 is a cross-sectional view taken along line V—V of FIG. 4.
Figure 6:
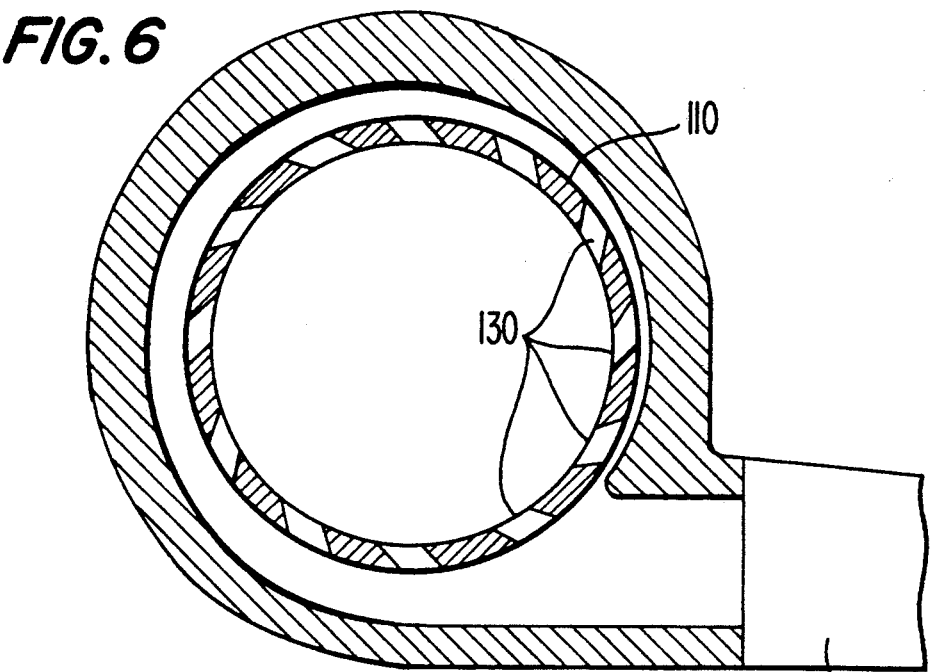
FIG. 6 is a cross-sectional view taken along line VI—VI of FIG. 4.

Injection nozzles 220, 250 are disposed laterally of the prechamber 200, for injecting fuel into the prechamber 200 along swirls in the prechamber 200 (see FIG. 5). The injection nozzles 220, 250 are connected to a fuel pump 230 by which the timing to inject fuel and the amount of fuel to be injection can be varied. The prechamber 200 has an exhaust port for discharging exhaust gases through the prechamber 200. The exhaust port can be opened and closed by an exhaust valve 240, which is axially movable by a valve actuator 600 disposed around the shank of the exhaust valve 240.

The valve actuator 600 is structurally identical to the electromagnetic valve actuator 6 according to the first embodiment of the present invention.

The piston head surface of the piston 300 disposed in the cylinder 100 is covered with a heat-resistant heat insulating material such as ceramic, as with the prechamber 200. The piston 300 has a projection 310 a projection extending from the center of the piston head toward the prechamber 200. When the piston 300 reaches a position near the top dead center of its stroke, the projection 310 narrows the opening of the prechamber 200.

Exhaust gases discharged from the exhaust port are led through an exhaust pipe 410 to the turbine of a turbocharger 400. The turbocharger 400 has a rotatable shaft to which a rotary electric machine 430 is connected. When the rotary electric machine is energized by electric power supplied from an external power supply, it can develop a boost pressure.

The exhaust gases which have gone past the turbocharger 400 are led to a recovery turbine 440 by which remaining heat energy of the exhaust gases is converted into electric energy which is recovered by a controller 500.

The compressor of the turbocharger 400 can be rotated by the energy of the exhaust gases applied to the turbine or the electric energy supplied to the rotary electric machine, for supplying intake air under boost pressure through an intake pipe 420 to the intake ports 130.

The valve actuator 600, the fuel pump 230, and the rotary electric machine 430 are controlled by signals supplied from an input/output interface of the controller 500. To the input/output interface, there are connected a rotation sensor 550 for detecting the rotational speed and crankshaft angle of the engine, and an accelerator pedal movement sensor 560 for detecting the amount of depression of the accelerator pedal associated with the engine, and an electric generator of the recovery turbine 440. Therefore, signals from these sensors and recovered electric energy are applied to the controller 500.

The control unit 500 is of the same construction as that of the controller 8 according to the first embodiment.

A two-cycle mode in which the engine of the second embodiment operates as a two-cycle engine will be described below.

When the expansion stroke ends and the piston 300 is positioned near the bottom dead center, intake air supplied under boost pressure from the intake ports 130 flows into the cylinder 100 in which the intake air flows as circumferential air swirls. As the piston 300 moves upwardly, it pushes the exhaust gases upwardly and scavenges the exhaust gases from the exhaust port. On the upward movement of the piston 300, the exhaust port is closed by the exhaust valve 240, and the piston 300 enters the compression stroke in which the intake air is compressed. The continued ascent of the piston 300 accelerates the intake air in the cylinder 100 and forces the intake air into the prechamber 200.

When fuel is injected from the injection nozzles 200 into the prechamber 200 along the air swirls therein, the fuel is combusted. The piston 300 now enters the expansion stroke. The injected fuel is fully combusted in the prechamber 200 and the produced exhaust gases lower the piston 300. When the piston 300 is lowered, the opening of the prechamber 200 which has been narrowed by the projection 310 is enlarged, allowing the exhaust gases to be spread quickly into the cylinder 100. On the downward movement of the piston 300, the exhaust valve 240 is actuated to open the exhaust port for thereby discharging the exhaust gases. The above cycle is repeated following the next intake stroke.

Figure 7:
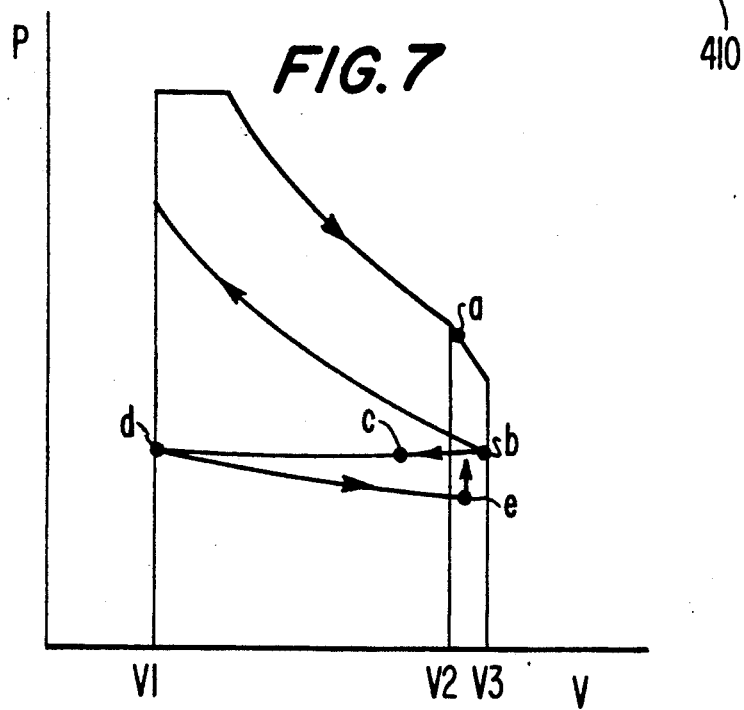
FIG. 7 is a graph showing a pressure vs. volume (p-v) diagram of the engine shown in FIG. 4 when it operates in a four-cycle mode.

A four-cycle mode in which the engine operates as a four-cycle engine will now be described below with reference to FIGS. 7 and 8. Engine conditions at points a through e in FIG. 7 are shown at a through e, respectively, in FIG. 8.

When the volume of the cylinder 100 and the prechamber 200 is increased from a point V1 at the top dead center where the combustion chamber is compressed to a point V2 immediately prior to the bottom dead center, in the expansion stroke after combustion, the exhaust port is opened to start discharging the exhaust gases.

While the volume is expanded through a condition shown at a in FIG. 8 to a point V3 at the bottom dead center, the pressure in the cylinder 100 and the prechamber 200 quickly drops. Since the intake ports 130 are opened at the bottom dead center shown at b in FIG. 8, intake air supplied under boost pressure is introduced as swirling air flows into the cylinder 100.

The introduced intake air pushes the exhaust gases upwardly to assist in discharging the exhaust gases from the exhaust port. The piston 300 moves upwardly from the bottom dead center, closing the intake ports 130 to stop introducing the intake air. Even at this time, exhaust gases still remain in the cylinder 100. Therefore, the exhaust port remains open as indicated at c in FIG. 8. The exhaust port is continuously open until the piston 300 reaches the top dead center, whereupon the exhaust gases are completely discharged from the cylinder.

Then, the exhaust port is closed at the top dead center V1 as indicated at d in FIG. 8. With the exhaust port closed, the piston 300 is lowered to cause the intake air sealed in the cylinder 100 to be adiabatically expanded. Since the temperature of the intake air is lowered during the adiabatic expansion, the intake air quickly absorbs heat energy from the inner wall of the combustion chamber, thus lowering the temperature of the combustion chamber inner wall.

When the piston 300 moves past a point immediately prior to the bottom dead center V3 as indicated at e in FIG. 8, intake air rapidly flows from the intake ports 130 into the cylinder 100 under the boost pressure and a vacuum developed in the cylinder 100. Since the intake ports 130 are inclined with respect to the central axis of the cylinder 100 as shown in FIG. 6, the introduced intake air swirls at high speed in the cylinder 100.

As the piston 300 moves upwardly, the swirling air flows in the cylinder 100 are moved into the prechamber 200.

In the latter half of the compression stroke of the piston 300, the amount of intake air flowing into the prechamber 200 is reduced. However, the projection 310 on the piston head enters narrows the opening of the prechamber 200, thereby accelerating the air swirls as they go into the prechamber 200. Accordingly, when the compression stroke ends, air swirls at higher speed are produced in the prechamber 200. Then, fuel is injected from the injection nozzle 220 into the prechamber 200 along the air swirls. The injected fuel is now ignited and combusted, and then the piston 300 initiates the expansion stroke.

Figure 9:
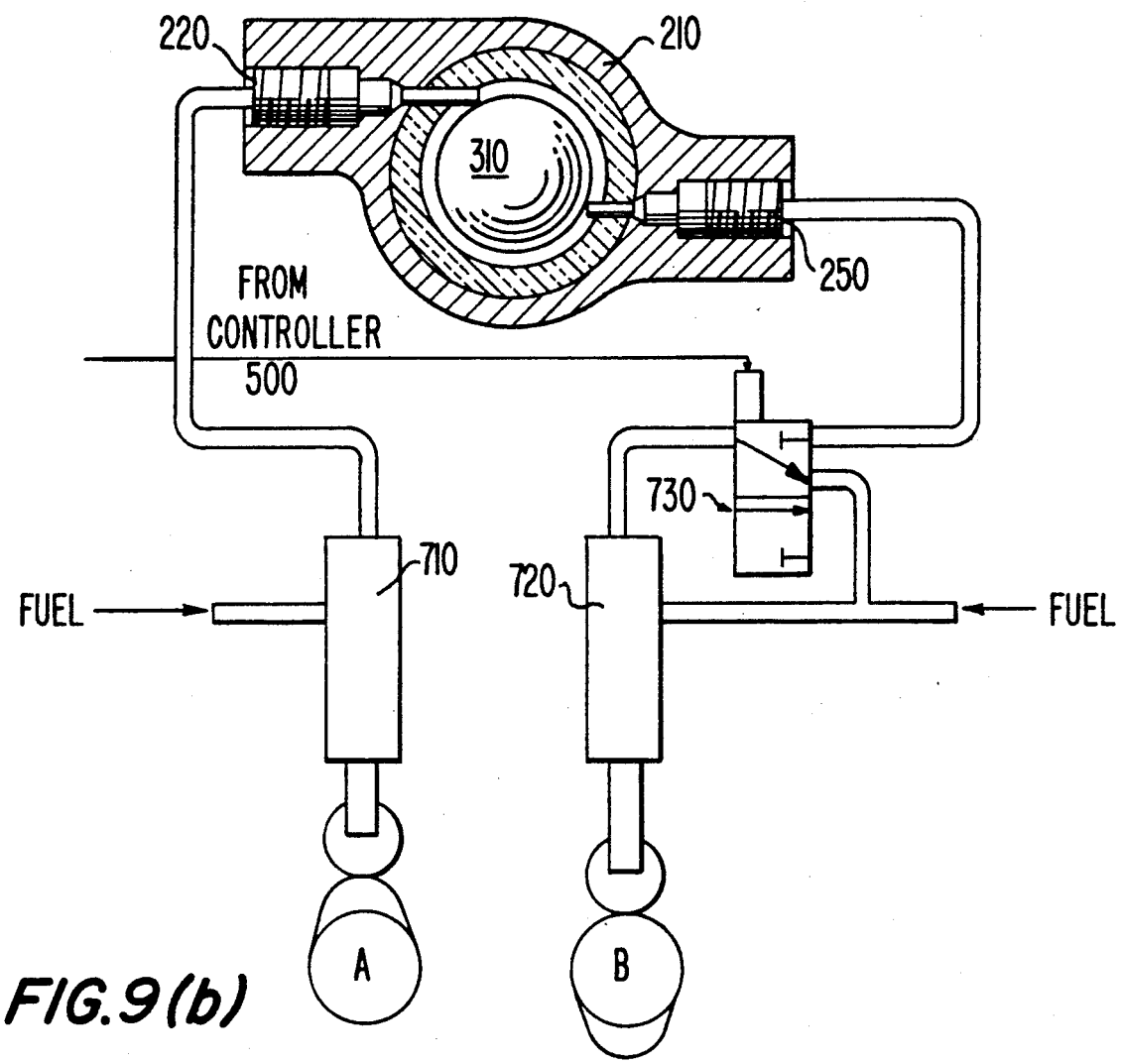
FIGS. 9(a) and 9(b) show an injection timing varying device.
Figure 9:
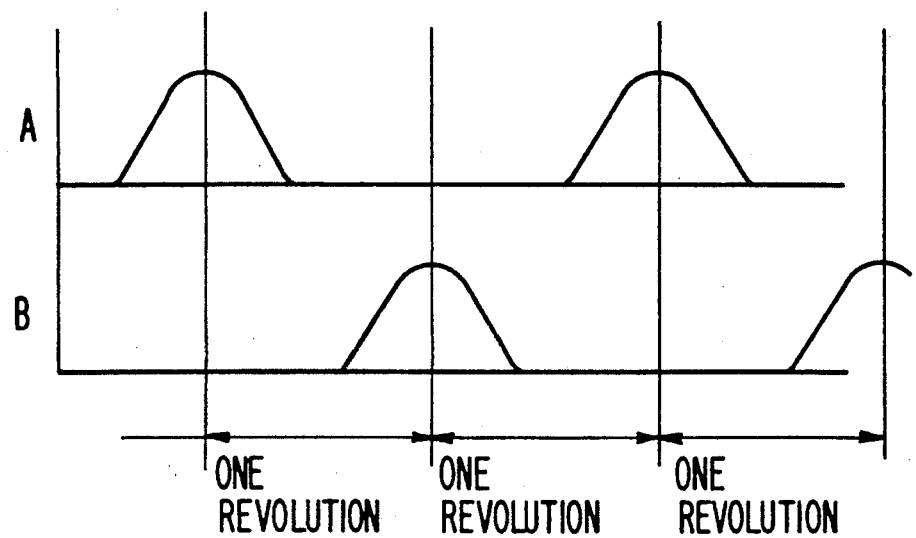

An injection timing varying means which includes the fuel pump 230 will be described below with reference to FIG. 9. The engine according to the first embodiment also has an injection timing varying means which includes the fuel pump 93, the injection timing varying means being identical to the injection timing varying means shown in FIG. 9.

FIG. 9(a) shows in block form the injection timing varying means. FIG. 9(a) is a combination of the view taken along line V—V of FIG. 4 and a view showing a structure of the fuel pump 230.

The injection nozzle 220 is angularly oriented to inject fuel along the wall surface of the prechamber 200 along which the air swirls flow. The injection nozzle 250 is angularly oriented to inject fuel more toward the center of the prechamber 200 than the injection nozzle 220.

The injection nozzle 220 is coupled to a plunger pump 710 which is actuated by a cam A, and the injection nozzle 220 is coupled through a directional control valve 730 to a plunger pump 720 which is actuated by a cam B.

FIG. 9(b) illustrates the cam profiles of the cams A, B. The cams A, B operate the pump plungers 710, 720, respectively, each time the engine makes one revolution, but out of phase by one revolution.

When the engine operates as a four-cycle engine, the supply of fuel to the injection nozzle 250 is cut off by the directional control valve 730, so that fuel is supplied from only the injection nozzle 220. Since the rotational speed of the engine is high when the engine operates as a four-cycle engine, the air swirls at a high speed in the prechamber 200, and the fuel which is injected along the prechamber wall from the injection nozzle 220 is well combusted.

When the rotational speed of the engine is lower than a predetermined speed, the directional control valve 730 is opened to supply fuel to the injection nozzle 250. Fuel is now injected alternately from the injection nozzles 220, 250 each time the engine makes one revolution. Since the injection nozzle 250 injects fuel more toward the center of the prechamber 200 than the injection nozzle 220, the fuel injected from the injection nozzles 220, 250 is shifted as a whole toward the center of the prechamber 200. Therefore, fuel can also be well combusted in the lower speed range in which the air swirls at a lower speed.

The relationship between the rotational speeds and torques of the engines according to the first and second embodiments of the present invention will be described with reference to FIG. 10.

The graph of FIG. 10 has a horizontal axis representing the rotational speed N of the engine, and a vertical axis representing the torque T produced by the engine.

In a range in which the rotational speed N is higher than a predetermined speed N2, the engine operates as a four-cycle engine. In a range in which the rotational speed N is lower than the predetermined speed N2, the engine operates as a two-cycle engine.

In a range in which the rotational speed N is lower than a lower speed N1, since the energy of exhaust gases is insufficient, electric energy is supplied to the rotary electric machine 72 or 430 for increasing the boost pressure under which intake air is supplied to the cylinder. In this manner, the torque of the engine is increased in such a lower speed range.

If the load on the engine is increased in the speed ranges higher than the speed N1, then electric power is supplied to the rotary electric machine 72 or 430 to increase the boost pressure, and the amount of injected fuel is also increased, for thereby increasing the output power of the engine.

If the engine is operated in the manner described above, the torque generated by the engine increases as the rotational speed decreases. The engine thus controlled is optimum for use as a power unit for motor vehicles. An advantage of the engine with such torque characteristics is that the number of gear positions of a transmission combined with the engine may be reduced or such gear positions may be eliminated.

Although certain preferred embodiments have been shown and described, it should be understood that many changes and modifications may be made therein without departing from the scope of the appended claims.

What is claimed is:

1. A variable-cycle engine selectively operable in different cycle modes depending on the rotational speed thereof, comprising:

a cylinder having a first intake port and an exhaust port which are defined in an upper portion thereof;

a piston reciprocally fitted in said cylinder and having a piston head surface, said cylinder also having a second intake port defined in a cylindrical wall thereof and positioned such that the second intake port corresponds in position to the piston head surface when said piston is positioned near the bottom dead center thereof;

an intake valve for opening and closing said first intake port;

an exhaust valve for opening and closing said exhaust port;

a sleeve valve slidably fitted over said cylinder and angularly movable around said cylinder, for opening and closing said second intake port;

intake valve actuator means for actuating said intake valve to open and close said first intake port;

exhaust valve actuator means for actuating said exhaust valve to open and close said exhaust port;

sleeve valve actuator means for angularly moving said sleeve valve to open and close said second intake port;

supercharging means for supplying intake air under pressure through at least said second intake port into said cylinder;

two fuel injection nozzles alternately operable to inject fuel into said cylinder each time the engine makes one revolution;

injection timing varying means for inactivating one of said two fuel injection nozzles; and cycle mode selecting means for detecting the rotational speed of the engine, and for activating said exhaust valve actuator means, inactivating said intake valve actuator means and said injection timing varying means, and activating said sleeve valve actuator means to open said second intake port, thereby operating the engine in a two-cycle mode, when the detected rotational speed is lower than a predetermined speed, and for activating said intake valve actuator means, said exhaust valve actuator means, and said injection timing varying means, and inactivating said sleeve valve actuator means to close said second intake port, thereby operating the engine in a four-cycle mode, when the detected rotational speed is higher than said predetermined speed.

2. A variable-cycle engine according to claim 1, wherein said supercharging means comprises a turbocharger having a compressor drivable by the energy of exhaust gases discharged from said exhaust port, for supplying intake air under pressure, and a rotary electric machine for assisting in driving said compressor.

3. A variable-cycle engine according to claim 2, further comprising supercharging assisting means for energizing said rotary electric machine to assist in driving said compressor when the rotational speed is lower than another predetermined speed lower than said first-mentioned predetermined speed.

4. A variable-cycle engine according to claim 1, wherein said sleeve valve comprises an annular strip extending around said cylinder and slidably circumferentially for opening and closing said second intake port.

5. A variable-cycle engine according to claim 1, wherein said second intake port is inclined with respect to the central axis of said cylinder, said one of the fuel injection nozzles which is inactivated by said injection timing varying means being oriented to inject fuel along a swirling flow of intake air which is drawn into said cylinder from said second intake port, the other fuel injection nozzle being oriented to inject fuel along the swirling flow and also more along an inner wall surface of said cylinder than said one fuel injection valve.

6. A variable-cycle engine selectively operable in different cycle modes depending on the rotational speed thereof, comprising:
   a cylinder having an exhaust port which is defined in an upper portion thereof;
   an exhaust valve for opening and closing said exhaust port;
   valve actuator means for actuating said exhaust valve to open and close said exhaust port;
   a piston reciprocally fitted in said cylinder and having a piston head surface, said cylinder also having an intake port defined in a cylindrical wall thereof and positioned such that the intake port corresponds in position to the piston head surface when said piston is positioned near the bottom dead center thereof;
   supercharging means for supplying intake air under pressure from said intake port into said cylinder;
   two fuel injection nozzles alternately operable to inject fuel into said cylinder each time the engine makes one revolution;
   injection timing varying means for inactivating one of said two fuel inejction nozzles; and
   cycle mode selecting means for detecting the rotational speed of the engine, and for activating said exhaust valve actuator means to operate said exhaust valve each time the engine makes one revolution, and inactivating said injection timing varying means, thereby operating the engine in a two-cycle mode, when the detected rotational speed is lower than a predetermined speed, and for activating said exhaust valve actuator means to operate said exhaust valve each time the engine makes two revolutions, and activating said injection timing varying means, thereby operating the engine in a four-cycle mode, when the detected rotational speed is higher than said predetermined speed.

7. A variable-cycle engine according to claim 6, wherein said supercharging means comprises a turbocharger having a compressor drivable by the energy of exhaust gases discharged from said exhaust port, for supplying intake air under pressure, and a rotary electric machine for assisting in driving said compressor.

8. A variable-cycle engine according to claim 7, further comprising supercharging assisting means for energizing said rotary electric machine to assist in driving said compressor when the rotational speed is lower than another predetermined speed lower than said first-mentioned predetermined speed.

9. A variable-cycle engine according to claim 6, wherein said intake port is inclined with respect to the central axis of said cylinder, said one of the fuel injection nozzles which is inactivated by said injection timing varying means being oriented to inject fuel along a swirling flow of intake air which is drawn into said cylinder from said intake port, the other fuel injection nozzle being oriented to inject fuel along the swirling flow and also more along an inner wall surface of said cylinder than said one fuel inejection valve.

* * * * *

UNITED STATES PATENT AND TRADEMARK OFFICE
CERTIFICATE OF CORRECTION

PATENT NO. : 5,022,353

DATED : June 11, 1991

INVENTOR(S) : Hideo Kawamura

It is certified that error appears in the above-identified patent and that said Letters Patent is hereby corrected as shown below:

```
Col. 5, line 19, "sequences" should be --sequences--.
Col. 8, line 58, "93" should be --92--.
```

Signed and Sealed this

Twenty-fourth Day of November, 1992

Attest:

DOUGLAS B. COMER

*Attesting Officer*   *Acting Commissioner of Patents and Trademarks*